(12) United States Patent
Purpura

(10) Patent No.: US 7,080,116 B2
(45) Date of Patent: Jul. 18, 2006

(54) NETWORK BLOCKING DEVICE FOR PAID INTERNET SERVICES

(75) Inventor: William J. Purpura, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 886 days.

(21) Appl. No.: 09/934,338

(22) Filed: Aug. 21, 2001

(65) Prior Publication Data

US 2003/0041120 A1    Feb. 27, 2003

(51) Int. Cl.
    *G06F 15/13* (2006.01)
(52) U.S. Cl. .................. 709/203; 455/501; 455/561
(58) Field of Classification Search .......... 709/203; 455/501, 561
    See application file for complete search history.

(56) References Cited

U.S. PATENT DOCUMENTS

| 6,163,681 A | 12/2000 | Wright et al. |
| 6,438,468 B1 * | 8/2002 | Muxlow et al. ............ 701/3 |
| 2001/0041594 A1 * | 11/2001 | Arazi et al. .............. 455/561 |
| 2002/0068592 A1 * | 6/2002 | Hutcheson et al. ......... 455/501 |
| 2002/0083339 A1 * | 6/2002 | Blumenau et al. ......... 713/201 |
| 2002/0141387 A1 | 10/2002 | Orshan |
| 2002/0160773 A1 | 10/2002 | Gresham et al. |

FOREIGN PATENT DOCUMENTS

WO    WO 00/63806    * 10/2000

* cited by examiner

*Primary Examiner*—John Follansbee
*Assistant Examiner*—Jinsong Hu
(74) *Attorney, Agent, or Firm*—Harness Dickey & Pierce P.L.C.

(57) ABSTRACT

A network architecture for blocking access to mobile pay per use Internet services is provided that comprises an Internet Protocol (IP) sniffer that pings the network devices to determine presence of a network device and which further communicates the presence thereof to a server such that access to the Internet services by the network device may be blocked. Generally, the IP sniffer sweeps all possible combinations of addresses in a LINKLOCAL network to detect the addition of a network device on a port and reconfirms for a period of time to verify the presence thereof. Once the network device is confirmed, a signal is transmitted to the server such that the sharing violation may be further investigated or terminated. The IP sniffer is preferably in the form of a module within a seat electronics box of a mobile platform.

20 Claims, 1 Drawing Sheet

NETWORK BLOCKING DEVICE FOR PAID INTERNET SERVICES

FIELD OF THE INVENTION

The present invention relates generally to pay per use Internet services and more particularly to systems that detect and verify the presence of network devices that share the Internet services on a mobile platform.

BACKGROUND OF THE INVENTION

Existing systems that receive pay per use Internet services commonly provide for sharing of a connection to the Internet services amongst multiple network devices for cost efficiency. For example, current Microsoft® Windows 98/2000 software technology allows users to share one Internet connection with multiple devices operating on a local network. More specifically, an Internet Connection Sharing function is provided in the Windows operating system such that one computer, hereinafter referred to as the Connection Sharing Computer, manages communications with the Internet services amongst a plurality of network devices, e.g. personal computers.

Generally, the Connection Sharing Computer establishes an initial, charged local area network (LAN) connection. The Connection Sharing Computer then serves as a controlling device for the LAN by providing Internet Protocol (IP) addresses and name resolution services for other computers on the LAN, hereinafter referred to as network devices. The network devices may then access the Internet through the Connection Sharing Computer using private IP addressing translation. More specifically, when a network device on the network sends a request to the Internet, its private address is transmitted to the Connection Sharing Computer, and the Connection Sharing Computer then translates the IP address of the network device to its own Internet IP address and then sends it on to the Internet.

Private IP addressing translation occurs when automatic addressing is enabled, which allows the Connection Sharing Computer to use Dynamic Host Configuration Protocol (DHCP) to dynamically assign private IP address to all network devices on a LAN. A user may disable automatic addressing and statically assign an IP address to each network device on the LAN if DHCP is not used, which is common in many European countries. Further, the Connection Sharing Computer may also use sharing features to allow outside users on the Internet to access web sites, e-mail, and game servers that are hosted on the LAN.

To enable Internet Connection Sharing, all network devices on the LAN must have network adapters. One network device is the Connection Sharing Computer, which serves to establish a connection to the Internet using the method offered by the pay per use system, wherein an Internet connection wizard establishes the connection. Interfacing between the network devices is accomplished by assigning automatic private IP addresses for a LAN using TCP/IP (Transmission Control Protocol/Internet Protocol), which allows users to have a small network with assigned unique IP addresses to the network adapter of the Connection Sharing Computer using a "LINKLOCAL" network.

Generally, LINKLOCAL network addresses begin with 169.254 and are used for private, internal addresses and thus are not valid for host computers that are not visible on the Internet. More specifically, the IP addresses cannot be used for computers linked by Internet Connection Sharing, as Internet Connection Sharing networks use addresses in the 192.168.0.xxx range. Accordingly, after a network adapter of a network device is assigned a LINKLOCAL network IP address, network devices can communicate, using TCP/IP protocol, with any other network device on the local network that uses the same addressing.

Despite extensive sophistication, a typical charge per use LAN system recognizes only the Connection Sharing Computer on the local network, due to the direct connection thereof. Accordingly, once the initial, charged Internet connection is established, Internet Connection Sharing is executed to configure the Connection Sharing Computer among other network devices. Further, the Internet Connection Sharing may also be used to configure external devices on the LAN to use file and print sharing to access resources from one another. Although the Internet Connection Sharing prevents access to the shared resource from the Internet, access by network devices is not monitored or blocked in network systems of the known art.

Accordingly, there remains a need in the art for a network architecture wherein access by network devices through a Connection Sharing Computer may be detected and verified, and further blocked if necessary. A need further exists for a network architecture that is capable of detecting, verifying, and blocking access by network devices in a mobile platform network.

SUMMARY OF THE INVENTION

In one preferred form, the present invention provides a network architecture for blocking access to pay per use Internet services that comprises an Internet Protocol (IP) sniffer. Generally, the IP sniffer pings network devices (e.g., personal computers, laptops) to determine the presence of a network device in a local area network. If the IP sniffer detects a network device, the presence thereof is communicated to a server such that access to the Internet services by the network device may be blocked, if necessary.

Generally, the IP sniffer sweeps all possible combinations of addresses in a LINKLOCAL network to detect the addition of a network device on a port and reconfirms for a period of time to verify the presence thereof. Once the network device is confirmed, a signal is transmitted to the server such that the sharing violation may be further investigated or terminated. Preferably, the IP sniffer in one form is a module within a seat electronics box of a mobile platform (e.g., commercial aircraft), as described in greater detail below. Accordingly, the IP sniffer will constantly ping all network devices connected to each seat electronics box in a mobile platform.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
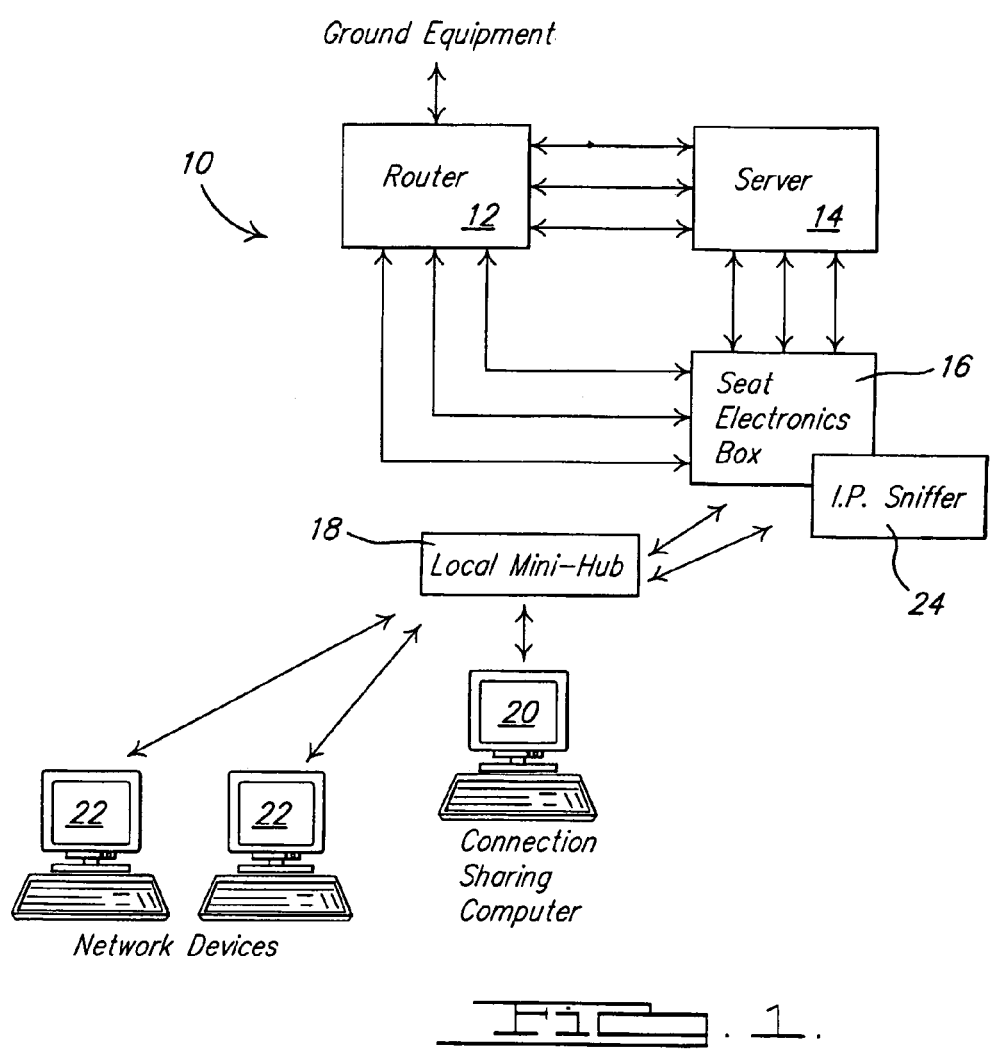
FIG. 1 is a flow diagram of a network architecture in accordance with the present invention.

The following description of the preferred embodiments is merely exemplary in nature and is in no way intended to limit the invention, its application, or uses.

Referring to the drawings, a network architecture according to the present invention is illustrated and generally indicated by reference numeral 10 in FIG. 1. As shown, the network architecture 10 is incorporated within a mobile platform environment, i.e. commercial air travel, wherein a router 12 receives and transmits Internet services via air-to-ground communications and transmits the Internet services to a server 14 and to a seat electronics box 16 within the mobile platform. The Internet services are then transmitted through a local mini-hub 18, which transmits the services to a Connection Sharing Computer 20. The Connection Sharing Computer 20 then provides access to the Internet services for a plurality of network devices 22. As further shown, an IP sniffer 24 is incorporated within electronics of the seat electronics box 16 to detect, verify, and block access to pay per use Internet services by the network devices 22 as described in greater detail below.

Although the following detailed description is directed to a mobile platform such as a commercial aircraft, the invention is also applicable to other modes of mass transit such as ship, train, bus, among others. Accordingly, the reference to commercial aircraft should not be construed as limiting the scope of the present invention.

As shown, the router 12 communicates with ground equipment to receive the Internet services and to transmit requests for Internet services from the Connection Sharing Computer 20 and the network devices 22. The communications between the router 12 and the ground equipment generally comprises routing and forwarding, IP multicast forwarding, traffic control, point to point protocol over Ethernet (PPPoE) access server, network address translation (NAT), and network time protocol (NTP). The router 12 then transmits and receives proxied web accesses and domain name service (DNS) queries to and from the server 14.

The server 14 is generally a web server, a proxy server, a DNS server, an authorization server, and a default gateway for additional local networks. Further, the server 14 transmits and receives web accesses and DNS queries to and from the seat electronics box 16. Accordingly, the seat electronics box 16 generally comprises address resolution protocol (ARP) proxies, PPPoE relays, a dynamic host configuration protocol (DHCP) mini-server, simple network time protocol (SNTP), NAT for static laptops, and multicast stream control. Further, the seat electronics box 16 transmits and receives non-proxied traffic and PPPoe from a virtual private network (VPN) to and from the router 12.

As further shown, Internet services are transmitted to the local mini-hub 18 from the seat electronics box 16, preferably using dynamic host configuration (DHC). Generally, the Connection Sharing Computer 20 establishes an initial, charged local area network connection. The Connection Sharing Computer 20 then serves as a controlling device for the network by providing Internet Protocol (IP) addresses and name resolution services for the network devices 22. The network devices 22 may then access the Internet through the Connection Sharing Computer 20 using private IP addressing translation. More specifically, when a network device 22 on the network sends a request to the Internet, its private address is transmitted to the Connection Sharing Computer 20, and the Connection Sharing Computer 20 then translates the IP address of the network device to its own Internet IP address and then sends it on to the Internet.

Accordingly, the IP sniffer 24 is incorporated within the seat electronic box 16 to detect, verify, and if necessary, block access to the Internet services by the network devices 22. The IP sniffer 24 constantly pings all of the network devices 22 connected to each seat electronics box 16 of a mobile plafform for any IP address in the 169.254.X.X range. Since there are only 256×256 possible combinations, or 65,536 in total, a full sweep of the possible IP addresses may be completed approximately every 5 minutes to detect the addition of a network device 22 on a port.

Once a return ping is detected, the IP sniffer 24 reconfirms the connection by the network device 22 for approximately one more minute to verify the presence thereof. When a network device 22 is confirmed, the seat electronics box 16 sends a signal to the server 12, where either on-board personnel may be flagged to investigate the possible sharing violation or the network architecture 10 may terminate service to the port being shared by the network device 22. Accordingly, access to pay per use Internet services by network devices is monitored and controlled by the network architecture 10 of the present invention.

The description of the invention is merely exemplary in nature and, thus, variations that do not depart from the substance of the invention are intended to be within the scope of the invention. Such variations are not to be regarded as a departure from the spirit and scope of the invention.

What is claimed is:

1. A network architecture for selectively blocking access to a pay per use wide area network comprising:
    at least one server that provides access to the wide area network;
    a connection sharing computer in communication with the server, wherein the connection sharing computer accesses the wide area network;
    at least one network device comprising a network protocol address in a specific network protocol address range determined by the connection sharing computer, the network device in communication with the connection sharing computer, wherein the connection sharing computer provides access to the wide area network to the network device; and
    at least one network protocol sniffer module in communication with the server,
    wherein the network protocol sniffer pings the network device in the specific network protocol address range to determine a presence of the network device and communicates the presence to the server such that access to the wide area network by the network device may be selectively blocked by disconnecting the connection sharing computer from the wide area network.

2. The network architecture of claim 1 further comprising a router in communication with the server to manage data flow between a plurality of networks.

3. The network architecture of claim 1 further comprising a local mini-hub, wherein the connection sharing computer communicates with the network device through the local mini-hub.

4. The network architecture of claim 1, wherein the network protocol address of the network device is dynamically assigned by the connection sharing computer using dynamic host configuration protocol.

5. The network architecture of claim 1, wherein the network protocol address of the network device is statically assigned.

6. The network architecture of claim 1 further comprising an external wide area network device, wherein the connection sharing computer provides access to the server for the external wide area network device.

7. The network architecture of claim 1 further comprising a plurality of network devices, wherein the connection sharing computer provides access to the wide area network for the plurality of network devices.

8. The network architecture of claim 7, wherein the plurality of network devices communicate with one another through the network protocol addresses, thereby forming a local network.

9. The network architecture of claim 8, wherein the plurality of network devices communicate with one another using TCP/IP protocol.

10. The network architecture of claim 1, wherein the network protocol addresses of the network devices are not detectable by external wide area network devices.

11. The network architecture of claim 1, wherein the connection sharing computer provides access to shared resources for the network device.

12. A network architecture for selectively blocking access to a mobile pay per use Internet network being provided on a mobile platform, comprising:
    at least one server that provides access to the Internet;
    a connection sharing computer in communication with the server, wherein the connection sharing computer accesses the Internet;
    seat electronics in communication with the server;
    a plurality of network devices, each comprising an Internet Protocol address in a specific Internet Protocol address range, the specific Internet Protocol address range being determined by the connection sharing computer, the network devices in communication with the seat electronics and the connection sharing computer, wherein the connection sharing computer provides access to the Internet to the network devices; and
    a plurality of Internet Protocol sniffer modules in communication with the seat electronics,
    wherein the Internet Protocol sniffers ping the network devices in the specific Internet Protocol address range to determine a presence of the network devices and communicate the presence to the server such that access to the Internet by the network devices may be selectively blocked by disconnecting the connection sharing computer from the Internet network and notifying a network operator that the access of the connection sharing computer and the network device has been blocked.

13. The network architecture of claim 12 further comprising a router in communication with the seat electronics and the server to manage data flow between a plurality of networks.

14. The network architecture of claim 12 further comprising a local mini-hub, wherein the connection sharing computer communicates with the network devices through the local mini-hub.

15. The network architecture of claim 12, wherein the plurality of network devices communicate with one another through the Internet Protocol addresses, thereby forming a LINKLOCAL network.

16. The network architecture of claim 12, wherein the plurality of network devices communicate with one another using TCP/IP protocol.

17. The network architecture of claim 12, wherein the Internet Protocol addresses of the network devices are not detectable by external Internet devices.

18. The network architecture of claim 12, wherein the connection sharing computer provides access to shared resources for the network devices.

19. A method of selectively blocking access to pay per use wide area network service, the method comprising the steps of:
    (a) providing wide area network access to a mobile platform through a server in communication with a connection sharing computer, the connection sharing computer determining a specific network protocol address range;
    (b) providing the wide area network access from the connection sharing computer to a network device comprising a network protocol address in the specific network protocol address range;
    (c) pinging the network device in the specific network protocol address range with a wide area network protocol sniffer to determine a presence of a the network device;
    (d) reporting the presence of the network device to the server; and
    (e) selectively blocking access of the network device to the wide area network by disconnecting the connection sharing computer from the wide area network.

20. The method of claim 19, wherein the wide area network protocol sniffer is in communications with seat electronics of the mobile platform.

* * * * *